(12) United States Patent
Emde

(10) Patent No.: US 9,580,022 B2
(45) Date of Patent: Feb. 28, 2017

(54) SEPARATING OR HOLDING NET

(71) Applicant: NOELLE-PEPIN GmbH & Co. KG, Schwelm (DE)

(72) Inventor: Marc Emde, Ennepetal (DE)

(73) Assignee: NOELLE PEPIN GMBH & CO.KG, Schwelm (DE)

( * ) Notice: Subject to any disclaimer, the term of this patent is extended or adjusted under 35 U.S.C. 154(b) by 0 days.

(21) Appl. No.: 14/712,340

(22) Filed: May 14, 2015

(65) Prior Publication Data
US 2015/0343955 A1 Dec. 3, 2015

(30) Foreign Application Priority Data

May 30, 2014 (DE) ........................ 10 2014 008 102

(51) Int. Cl.
| | |
|---|---|
| *B60P 7/08* | (2006.01) |
| *B60R 7/00* | (2006.01) |
| *B60R 21/06* | (2006.01) |

(52) U.S. Cl.
CPC ............ *B60R 7/005* (2013.01); *B60P 7/0876* (2013.01); *B60R 21/06* (2013.01)

(58) Field of Classification Search
CPC ........................................................ B60R 7/005
USPC ................... 410/97, 117, 118, 129; 224/275; 296/24.43, 37.8, 37.16, 37.15; 87/2, 12
See application file for complete search history.

(56) References Cited

U.S. PATENT DOCUMENTS

2010/0290856 A1* 11/2010 Zahorec ........................ 410/118

* cited by examiner

*Primary Examiner* — Stephen Gordon
(74) *Attorney, Agent, or Firm* — Andrew Wilford

(57) ABSTRACT

A separating or holding net has a net mesh part, spaced fixation formations, and an elastic woven fabric strip extending along an edge of the net mesh part that extends between the fixation formations and having openings engaged in the fixation formations.

2 Claims, 1 Drawing Sheet

SEPARATING OR HOLDING NET

FIELD OF THE INVENTION

The present invention relates to a separating or holding net. More particularly this invention concerns such a net used with an upright surface to form a stowage pocket, for instance on a vehicle seat back.

BACKGROUND OF THE INVENTION

Such a holding and/or separating net has a net mesh part and an elastic edge member extending along an opening edge of the net mesh part between fixation formations. Such holding and/or separating nets are widely used. The elastic edge member of such holding and/or separating nets is frequently or usually made of a braided elastic cord whose ends are held in the fixation formations, and often transition parts are required for this purpose.

OBJECTS OF THE INVENTION

It is therefore an object of the present invention to provide an improved separating or holding net.

Another object is the provision of such an improved separating or holding net that overcomes the above-given disadvantages, in particular that can be produced with low technical design complexity.

SUMMARY OF THE INVENTION

This object is attained according to the invention in that the elastic edge member is an elongated elastic woven fabric strip that at the attachment sections thereof associated with the fixation formations has respective openings for engagement with the respective fixation formation. According to the invention, all transition parts between those fixation formations to which the elastic edge member is attached may be dispensed with since an engagement can be directly established between the elastic edge member and the fixation formations, in the customary manner in which they are designed, because of the openings that are provided on the attachment sections of the elastic edge member.

So as to be able to produce elastic edge members in a wide variety of requirement profiles in the appropriate length using a substantially continuously producible elastic edge member that is designed as a woven fabric strip, without any complex design measures whatsoever, it is advantageous for the woven fabric strip forming the elastic edge member to comprise an alternating sequence of a plurality of openings and a plurality of closed strip sections. An elastic edge member having the desired length can then be created by simply severing the woven fabric strip on a closed strip section.

According to an advantageous refinement, the woven fabric strip of the elastic edge member is designed as a two-layer double woven fabric strip at whose closed strip sections the two woven fabric strips forming the same are joined to each other, and at whose strip sections provided with openings, the two woven fabric strips of the double woven fabric strip are not joined to each other.

Alternatively, the woven fabric strip can also be designed to have three or more layers, the woven fabric strips being joined to each other on the closed strip sections and not joined at the strip sections provided with openings.

Embodiments of the separating or holding net according to the invention in which two or more elastic edge members designed as elongated elastic woven fabric strips, each being disposed on an edge of the net mesh part associated therewith, are also possible, of course.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
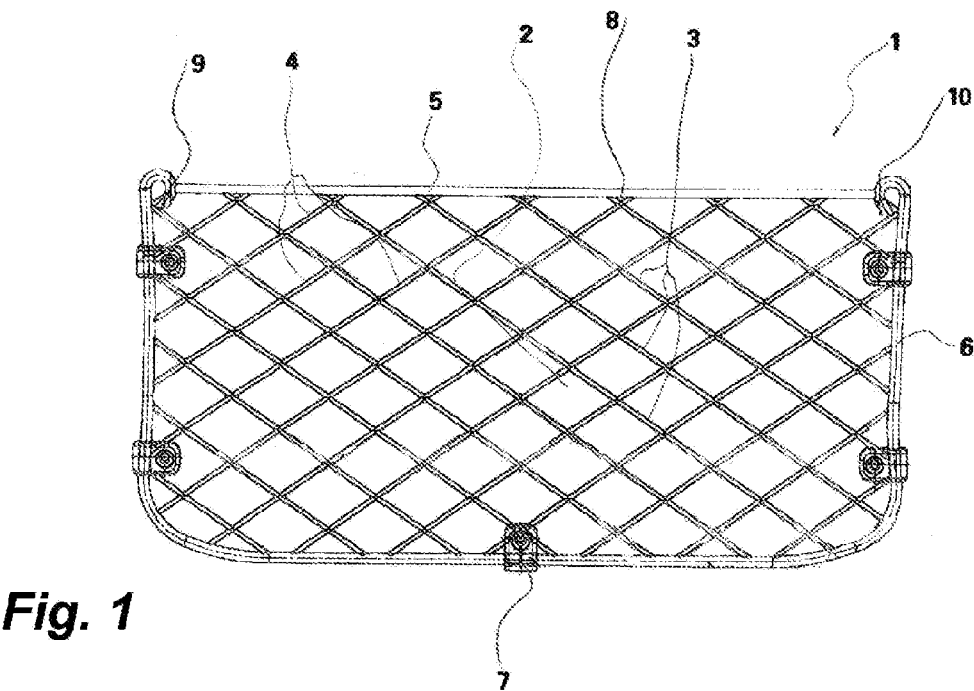
FIG. 1 is a front view of a separating or holding net according to the invention.

As seen in FIG. 1, a holding net 1 according to the invention is used to receive and retain objects and, for this purpose, is installed on an unillustrated upright mounting surface. The objects to be retained can be introduced between the holding net 1 and the mounting surface and held there.

Instead of the holding net 1, the invention described below can also be a separating net used to separate the luggage compartment from the remaining passenger compartment of a motor vehicle, for example.

The holding net 1 according to the invention shown in FIG. 1 comprises a net mesh part 2 formed of two strand sets 3 and 4 each composed of a plurality of mutually parallel net filaments disposed at a distance from each other, with the filaments of the set 3 crossing those of the set 4. The rhombic openings of the net mesh part 2 are formed by the two strand sets 3 and 4.

In the illustrated embodiment of the holding net 1 according to the invention shown in FIG. 1, an elastic edge member 5 is provided at the upper edge of the net mesh part 2. The elastic edge member 5 usually bears against the unillustrated mounting surface and thus closes the space between the holding net 1 and the mounting surface.

The elastic edge member 5 is joined at its two ends to a comparatively stiff edge part 6 of the holding net 1, the member being approximately U-shaped in the shown illustrated embodiment. This stiff edge part 6 passes through the edge loops or rhombi of the net mesh part 2 to stretch it.

Attachment clips 7 that secure the comparatively stiff edge part 6 and thus the holding net 1 to the unillustrated mounting surface are provided on the comparatively stiff edge part 6.

At its two ends, the elastic edge member 5 disposed on the upper edge 8 in the shown illustrated embodiment is engaged in two fixation formations or eyes 9 and 10 formed at the ends of the comparatively stiff edge part 6 to stretch the net mesh part 2 of the holding net 1 at the edges of the net mesh part 2 on which the elastic edge member 5 is not provided. Here, the fixation formations 9, 10 of the comparatively stiff edge part 6 are formed by simple bent sections of this comparatively stiff edge part 6 that itself is typically made of wire.

Figure 2:
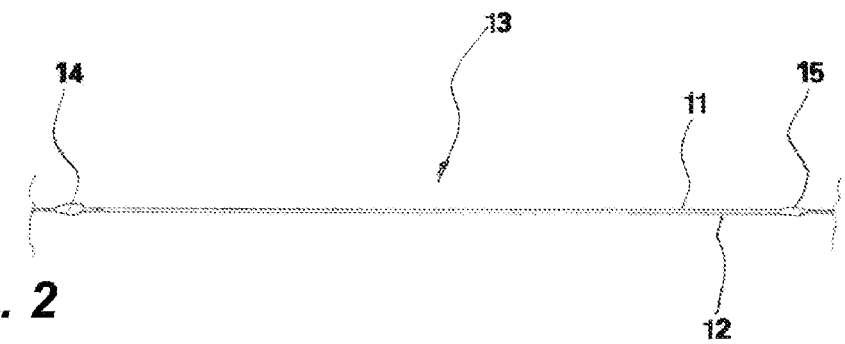
FIG. 2 shows one embodiment of an elastic edge member of the separating or holding net shown in FIG. 1.

The elastic edge member 5 shown in general in a first embodiment in FIG. 2 comprises two woven fabric substrips 11 and 12. These substrips 11 and 12 are joined to each other almost across the entire length in the illustrated embodiment shown in FIG. 2 and thus form a double woven fabric strip 13. The two fabric substrips 11 and 12 are not joined to each other at the two attachment sections of this double strip 13 so the strip 13 can be engaged in the two fixation formations 9 and 10 of the comparatively stiff edge part 6 of the holding net, since openings 14 and 15 are present there between the two woven fabric strips 11 and 12. The double woven fabric strip 13 can be pushed onto the two fixation formations 9 and 10 located on the edge member side through these openings 14 and 15.

FIG. 2 shows that the double woven fabric strip 13 can be produced substantially continuously with the openings 14 and 15 provided at a predetermined spacing, and a cut is made directly next to the openings 14 and 15 so as to separate the double woven fabric strip 13 into pieces having the desired length and the desired elasticity, and then mount them on the edge 8 of the net mesh part 2 associated therewith and engage them in the two fixation formations 9 and 10 of the comparatively stiff edge part 6 of the holding net 1.

Figure 3:
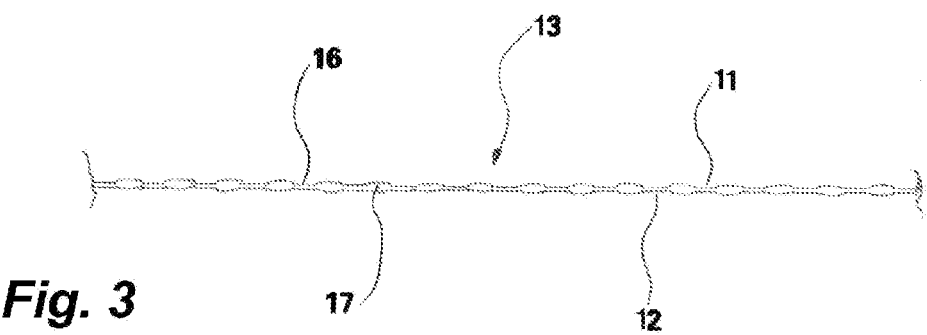
FIG. 3 shows a further embodiment of an elastic edge member of the separating or holding net shown in FIG. 1.

FIG. 3 shows an embodiment of the elastic edge member 5 in which the two woven fabric strips 11 and 12 of the double woven fabric strip 13 comprise alternating closed strip sections 16 and openings 17 where the two woven fabric strips 11 and 12 are not joined to each other. The closed strip sections 16 here have approximately the same length as the strip sections forming the openings 17. Correspondingly, the double woven fabric strip 13 shown in FIG. 3 can be severed depending on the requirements profile, so that elastic edge members 5 of substantially any arbitrary length for holding nets 1 having different dimensions can be created.

I claim:

1. A separating or holding net comprising:
   a net mesh part having an edge;
   spaced fixation formations at ends of the edge; and
   an elastic woven fabric strip extending along the edge of the net mesh part and having strip openings engaged in the fixation formations, the woven fabric strip having a plurality of the openings alternating with a plurality of closed strip sections, the openings at ends of the fabric strip being engaged over the fixation formations, the woven fabric strip being formed by a pair of three-layer woven fabric substrips joined to each other at the closed strip sections and not joined to each other at the strip openings.

2. The holding or separating net defined in claim 1, further comprising:
   a second such elastic woven fabric strip along an edge of the net mesh part.

* * * * *